(12) United States Patent
Beard

(10) Patent No.: US 9,120,511 B1
(45) Date of Patent: Sep. 1, 2015

(54) SYSTEMS AND METHODS FOR CAUSING A ROTATIONAL FORCE TO BE APPLIED TO A VEHICLE

(71) Applicant: Horizon Hobby, LLC, Champaign, IL (US)

(72) Inventor: Paul Beard, Bigfork, MT (US)

(73) Assignee: Horizon Hobby, LLC, Champaign, IL (US)

( * ) Notice: Subject to any disclaimer, the term of this patent is extended or adjusted under 35 U.S.C. 154(b) by 0 days.

(21) Appl. No.: 14/193,035

(22) Filed: Feb. 28, 2014

(51) Int. Cl.
*B62D 37/04* (2006.01)
*A63H 17/36* (2006.01)
*A63H 29/20* (2006.01)

(52) U.S. Cl.
CPC ............... *B62D 37/04* (2013.01); *A63H 17/36* (2013.01); *A63H 29/20* (2013.01)

(58) Field of Classification Search
USPC ............................. 280/217; 74/5.37; 244/165
See application file for complete search history.

(56) References Cited

U.S. PATENT DOCUMENTS

| 3,465,840 | A  | * | 9/1969 | Summers ................... 180/209 |
| 8,219,308 | B2 | * | 7/2012 | Leeser ...................... 701/124 |
| 8,355,834 | B2 | * | 1/2013 | Duggan et al. ............... 701/24 |
| 8,532,915 | B2 | * | 9/2013 | Kim et al. ................. 701/124 |
| 8,706,390 | B2 | * | 4/2014 | Kim et al. ................. 701/124 |

* cited by examiner

*Primary Examiner* — Kevin Hurley
(74) *Attorney, Agent, or Firm* — McDonnell Boehnen Hulbert & Berghoff LLP

(57) ABSTRACT

An example vehicle includes a rotational force control system (RFCS) coupled to a vehicle chassis. The RFCS includes a frame and a first flywheel mechanically coupled to the frame. The first flywheel is configured to spin about a first axis of the first flywheel and tilt about a second axis of the first flywheel. The example vehicle further includes a second flywheel mechanically coupled to the frame. The second flywheel is configured to spin about a first axis of the second flywheel and tilt about a second axis of the second flywheel. The RFCS is configured to cause a rotational force to be applied about at least one axis of the vehicle by changing an angular momentum of the first or second flywheels.

19 Claims, 9 Drawing Sheets

US 9,120,511 B1

SYSTEMS AND METHODS FOR CAUSING A ROTATIONAL FORCE TO BE APPLIED TO A VEHICLE

FIELD

The disclosed systems and methods relate generally to attitude control systems of vehicles. Disclosed embodiments relate to attitude control systems for vehicles such as full-scale, miniature, or remote controlled (RC) cars, boats, or aircraft.

BACKGROUND

Current techniques for controlling the attitude of a vehicle include throttle modulation and counter-steering. For example, pitch control may be performed by throttle modulation or counter-steering, and limited yaw control and extremely limited roll control may be performed by counter-steering.

SUMMARY

When controlling a vehicle such as a remote controlled (RC) car, or a full-scale or RC boat, it may be desirable to precisely control the attitude of the vehicle (e.g. control a pitch, yaw, or roll orientation of the vehicle) while the vehicle is on the ground, flying through the air, or floating on water. The disclosed systems and methods provide this capability.

In one example, a vehicle includes a rotational force control system (RFCS) coupled to the vehicle chassis. The RFCS includes a frame and a first flywheel mechanically coupled to the frame. The first flywheel is configured to spin about a first axis of the first flywheel and tilt about a second axis of the first flywheel. The example vehicle further includes a second flywheel mechanically coupled to the frame. The second flywheel is configured to spin about a first axis of the second flywheel and tilt about a second axis of the second flywheel. The RFCS is configured to cause a rotational force to be applied about at least one axis of the vehicle by changing an angular momentum of the first or second flywheels.

In a relate example, a method of controlling the attitude of a vehicle using a RFCS system includes spinning a first flywheel about a first axis of the first flywheel, where the first flywheel is mechanically coupled to a vehicle via a first gimbal allowing the first flywheel to tilt about a second axis of the first flywheel. The second axis of the first flywheel is perpendicular to the first axis of the first flywheel. The method further includes spinning a second flywheel about a first axis of the second flywheel. The second flywheel is mechanically coupled to the vehicle via a second gimbal allowing the second flywheel to tilt about a second axis of the second flywheel. The second axis of the second flywheel is perpendicular to the first axis of the second flywheel. The method further includes causing a rotational force to be applied about at least one axis of the vehicle by changing an angular momentum of the first and second flywheels.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
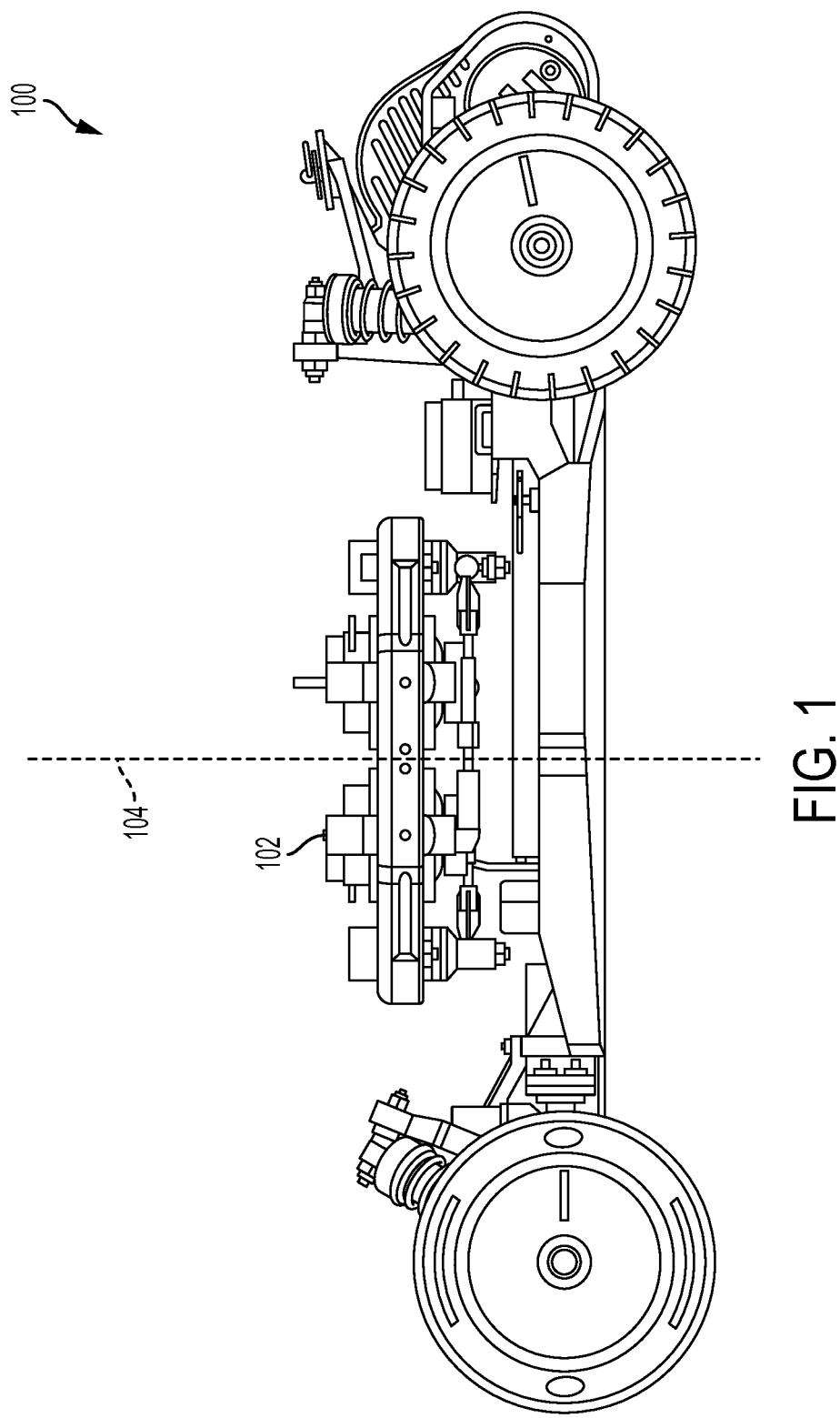
FIG. 1 illustrates a side view of an example RC car incorporating a rotational force control system (RFCS) according to some embodiments.

FIG. 1 shows a side view of an example RC car 100 equipped with a rotational force control system (RFCS) 102. FIG. 1 also illustrates yaw axis 104 of the RC car 100. The RC car 100 may be configured to move relative to a driving surface by rotating and/or tilting the wheels of RC car 100. The RFCS 102 is mechanically coupled to the vehicle. In operation, the RC car 100 may rotate about the yaw axis 104 when performing a turn or a executing a stunt, such as a power slide or other similar maneuver where the RC car 100 rotates about its yaw axis 104.

Figure 2:
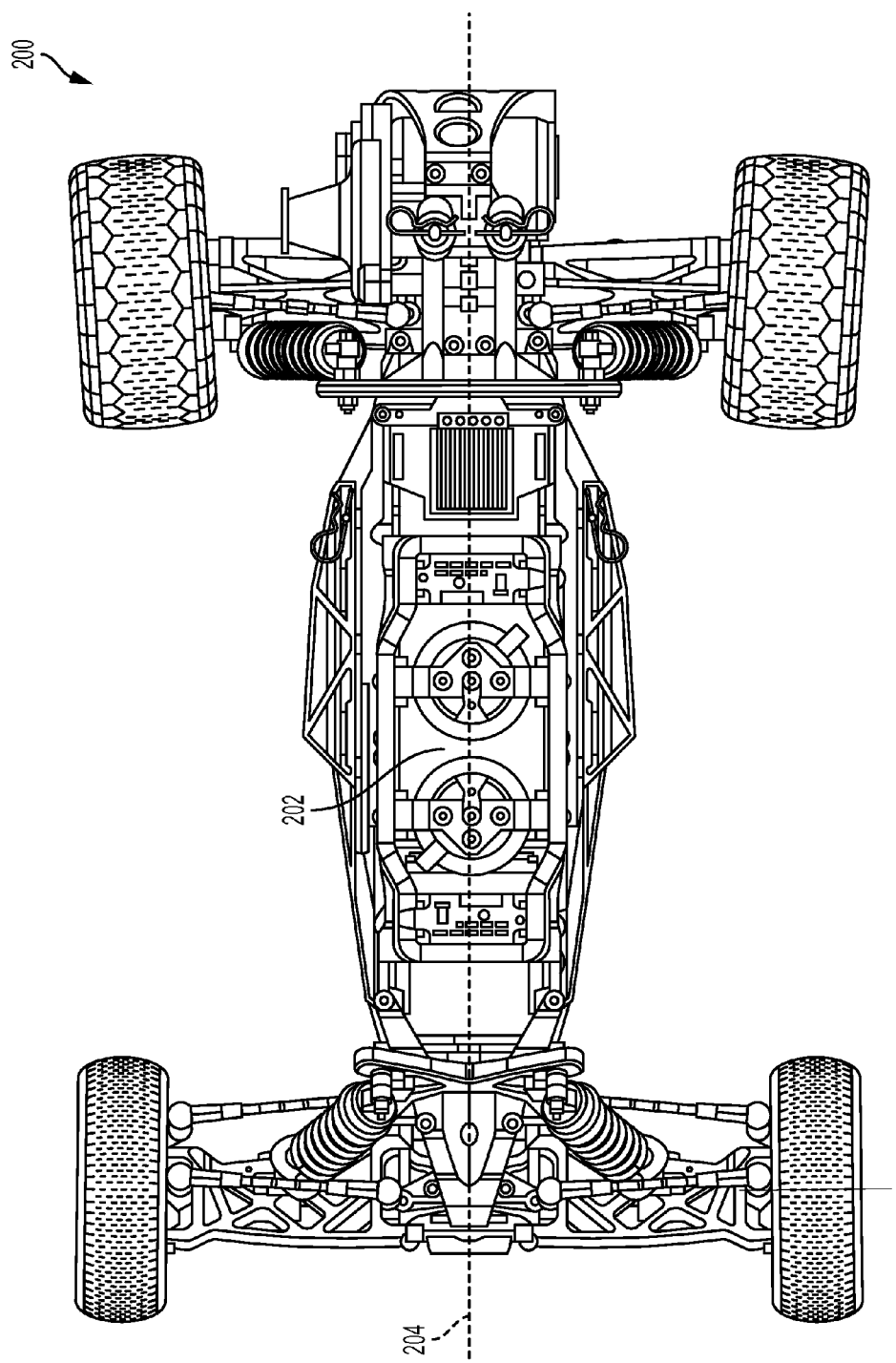
FIG. 2 illustrates a top view of an example RC car incorporating a RFCS system according to some embodiments.

FIG. 2 illustrates a top view of an example RC car 200 equipped with a rotational force control system (RFCS) 202. FIG. 2 also illustrates roll axis 204 of the RC car 200. In operation, the RC car 200 may rotate about the roll axis 204 while performing a turn or executing a stunt, such as a spiral, corkscrew, or barrel roll-type maneuver where the RC car 200 rotates about its roll axis 204.

Figure 3:
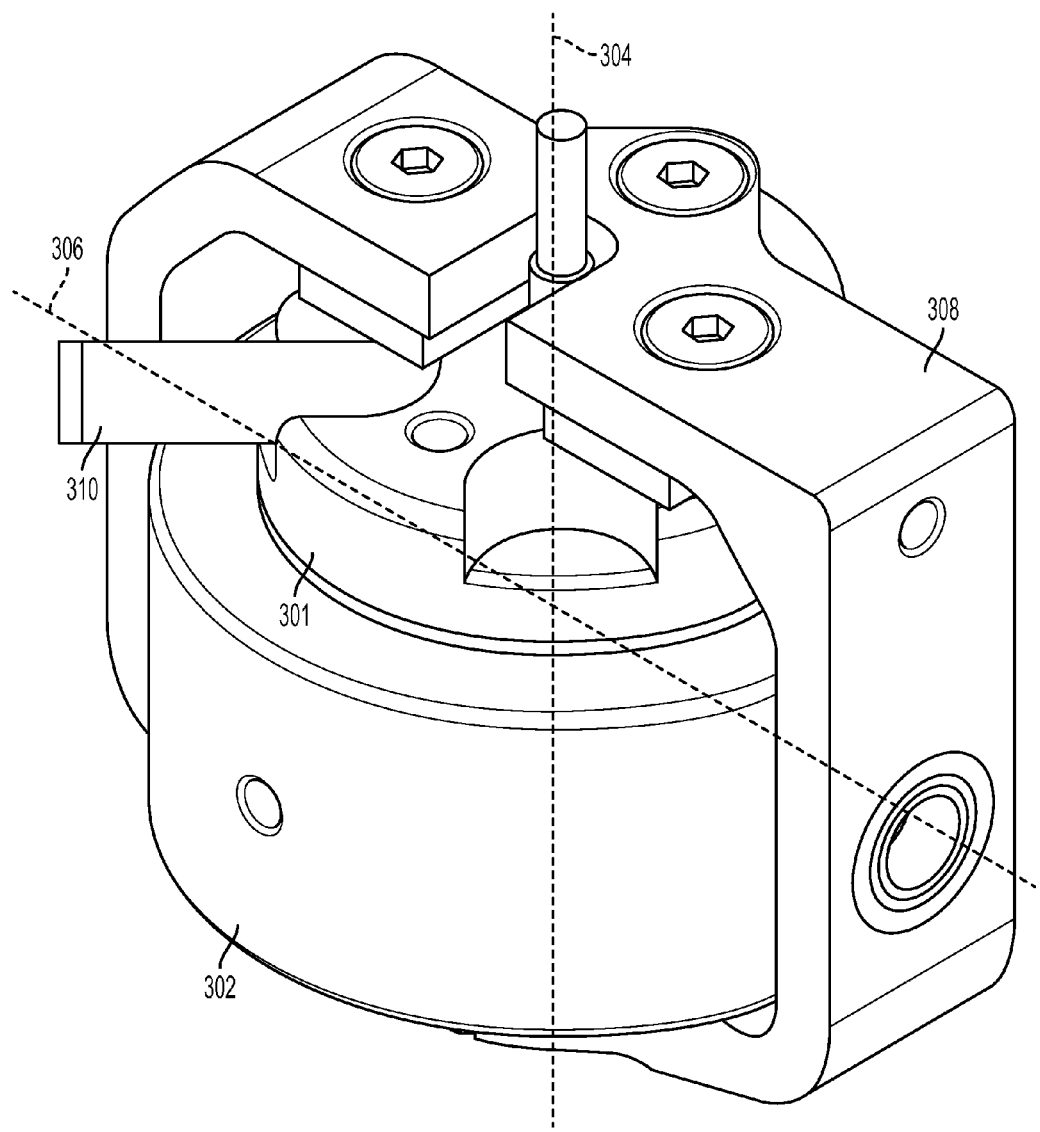
FIG. 3 illustrates an example component of a RFCS system according to some embodiments.

FIG. 3 illustrates an example component of a rotational force control system (RFCS), including a spin motor 301, a flywheel 302, a first axis 304, a second axis 306, a gimbal 308, and a control terminal 310.

The spin motor 301 is mechanically coupled to the flywheel 302 and configured to spin at various rotational speeds, in unison with the flywheel 302 (hereinafter, references to the flywheel 302 may also describe the spin motor 301). The flywheel 302 is configured to spin about the first axis 304 and tilt about the second axis 306. The gimbal 308 is mechanically coupled to the flywheel 302 (via the spin motor 301) to a frame (not shown) so that the flywheel may freely spin about the first axis 304 and tilt about the second axis 306. The control terminal 310 electrically couples the spin motor 301 to an electronic speed controller (not shown). The electronic speed controller causes the spin motor 301 and the flywheel 302 to spin at various rotational speeds.

Figure 4:
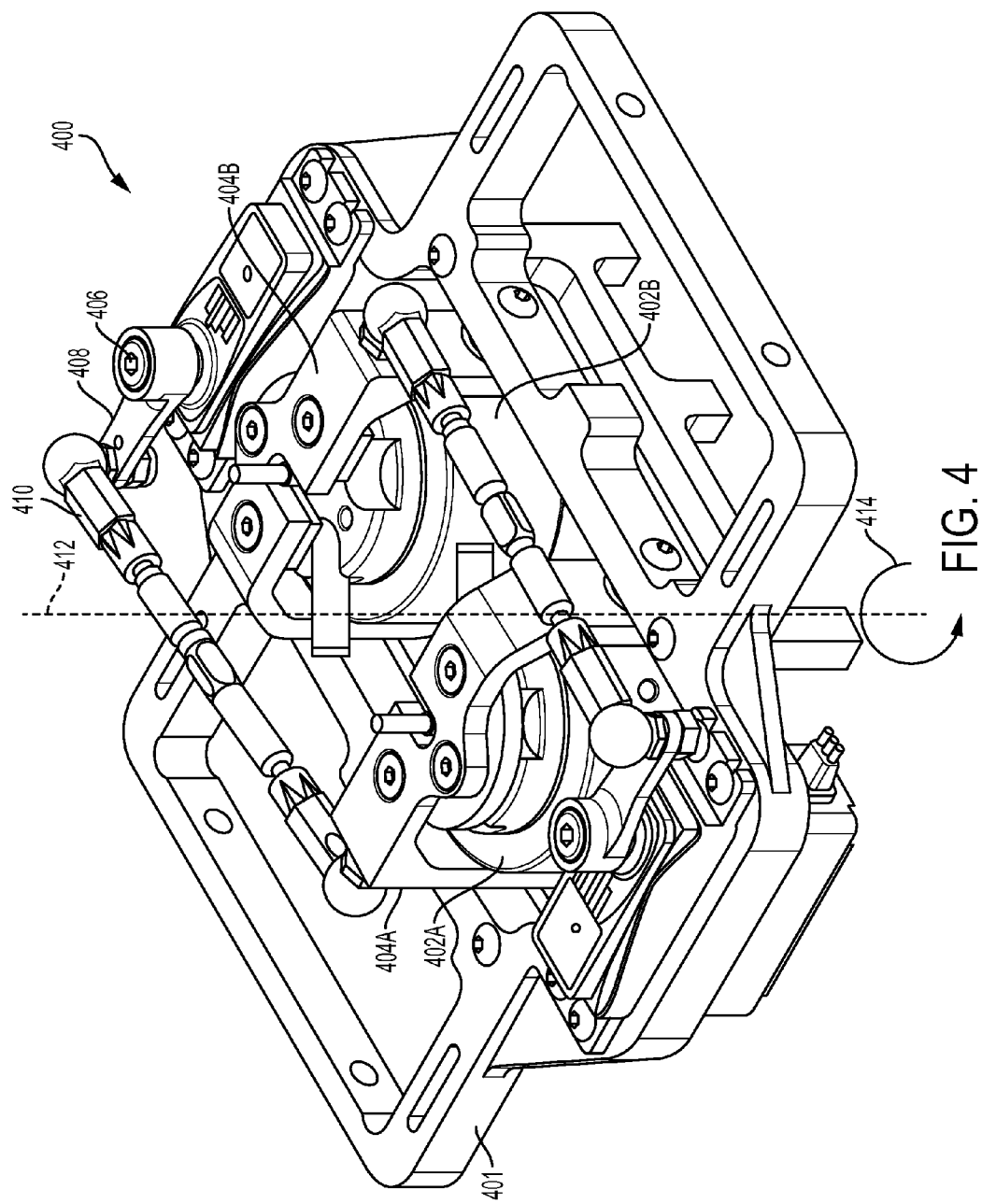
FIG. 4 illustrates an example RFCS system according to some embodiments.

FIG. 4 illustrates an example rotational force control system (RFCS) 400, including a frame 401, a first flywheel 402A, a second flywheel 402B, a first gimbal 404A, a second gimbal 404B, an output shaft 406, a servo arm 408, and a linkage arm 410. Yaw axis 412 is also shown.

The frame 401 is configured to mechanically couple the RFCS 400 to a vehicle chassis, such as a chassis of a car, boat or aircraft. The frame 401 holds the RFCS together as one contiguous unit.

The flywheels 402A/402B may have substantially equal masses and be respectively mechanically coupled to the frame 401 via the gimbals 404A/404B. The flywheels 402A/402B are also be configured to spin about respective first axes of the flywheels 402A/402B (see FIG. 3) at variable rotational speeds determined by electronic speed controllers. The flywheels 402A/402B may make up a significant portion of the weight of the RFCS 400 and/or the attached vehicle so that changing the angular momenta of the flywheels 402A/402B causes the RFCS 400 and/or the vehicle to experience a perceptible counterbalancing rotational force.

The first gimbal 404A and the second gimbal 404B respectively allow the first flywheel 402A and the second flywheel 402B to freely spin about respective first axes and to tilt about respective second axes (see FIG. 3). In this way the first flywheel 402A and the second flywheel 402B are coupled to the frame 401 but free to spin and tilt relative to the frame 401.

A servo motor is configured to rotate the output shaft 406 which is in turn mechanically coupled to the servo arm 408. As the output shaft 406 rotates, the servo arm 408 rotates with respect to an axis defined by the output shaft 406. The servo arm 408 is mechanically coupled to the linkage arm 410 so that movement by the servo arm 408 causes corresponding movement of the linkage arm 410. The linkage arm 410 is mechanically coupled to the first gimbal 404A such that movement by the linkage arm 410 causes the first gimbal 404A and the first flywheel 402A to tilt about the second axis of the first flywheel (see FIG. 3) in a direction determined by the direction of rotation of the output shaft 406.

For example, when the output shaft 406 rotates in a clockwise direction as viewed from above, it causes the first flywheel 402A to rotate in a clockwise direction about the first axis of the first flywheel 402A (i.e., causes the top of the first flywheel 402A to tilt toward the second flywheel 402A). Counterclockwise rotation of the output shaft 406 in the same way causes counterclockwise rotation of the first flywheel 402A (i.e., causes the top of the first flywheel 402A to tilt away from the second flywheel 402A). Similar components, as shown in FIG. 4, operate to tilt the second flywheel 402B in an analogous manner.

In certain examples, the RFCS 400 and/or the attached vehicle may be substantially isolated from external rotational forces, such as when the vehicle is flying through the air after running over a ramp. In this case, the net angular momentum of the RFCS 400 and/or the attached vehicle may remain constant. Changes in angular momenta of the flywheels 402A/402B induced by increasing or decreasing the rotational speed of one or more of the flywheels 402A/402B, or by tilting the flywheels 402A/402B, may be offset by a rotational force experienced by the RFCS 400 and/or the attached vehicle as a whole. That is, while the RFCS 400 and/or the attached vehicle are isolated from external rotational forces, the total net angular momentum of the RFCS 400 and/or the attached vehicle may not change, and the RFCS 400 and/or the vehicle may rotate to compensate for changes in the angular momentum of the flywheels 402A/402B.

In one embodiment, the RFCS 400 may spin the flywheels 402A/402B about their respective first axes (see FIG. 3) at equal rotational speeds, but in opposite directions. For example, when viewed from above the RFCS 400, the first flywheel 402A may accelerate from rest to rotate clockwise at 50 Hz and the second flywheel 402B may accelerate from rest to rotate counterclockwise at 50 Hz. This may have no net effect on the angular momentum of the RFCS 400 and/or the attached vehicle because, in this case, the change in rotational speeds of the flywheels 402A/402B induces respective angular momenta of equal magnitude but opposite direction, resulting in no net change in angular momentum.

By example, the RFCS 400 may then cause the first flywheel 402A to increase clockwise rotation speed to 60 Hz and cause the second flywheel 402B to decrease counterclockwise rotation speed to 40 Hz. With reference to the right-hand rule, this may cause a net angular momentum of the flywheels 402A/402B to increase in a downward direction parallel to the yaw axis 412 and the respective first axes of the flywheels 402A/402B. This may cause the RFCS 400 and/or the vehicle to experience a rotational force tending to increase the angular momentum of the RFCS 400 and/or the vehicle in the upward direction parallel to the yaw axis 412. If the RFCS 400 and/or the vehicle are free to move (e.g. airborne), this may result in the RFCS 400 and/or the vehicle rotating about the yaw axis 412 in the direction depicted at 414 (counterclockwise when viewing from above the RFCS 400).

A rotational force about the yaw axis 412 in a clockwise direction (when viewed from above the RFCS 400) may be created by similarly decreasing the rotational speed of the first flywheel 402A and increasing the rotational speed of the second flywheel 402B. Manipulating the rotational speeds of the flywheels 402A/402B while maintaining the first axes of the flywheels 402A/402B parallel to the yaw axis 412 can cause a rotational force to be applied to the RFCS 400 and/or the vehicle about the yaw axis 412 without creating rotational forces about the roll or pitch axes of the RFCS 400 and/or the vehicle.

Figure 5:
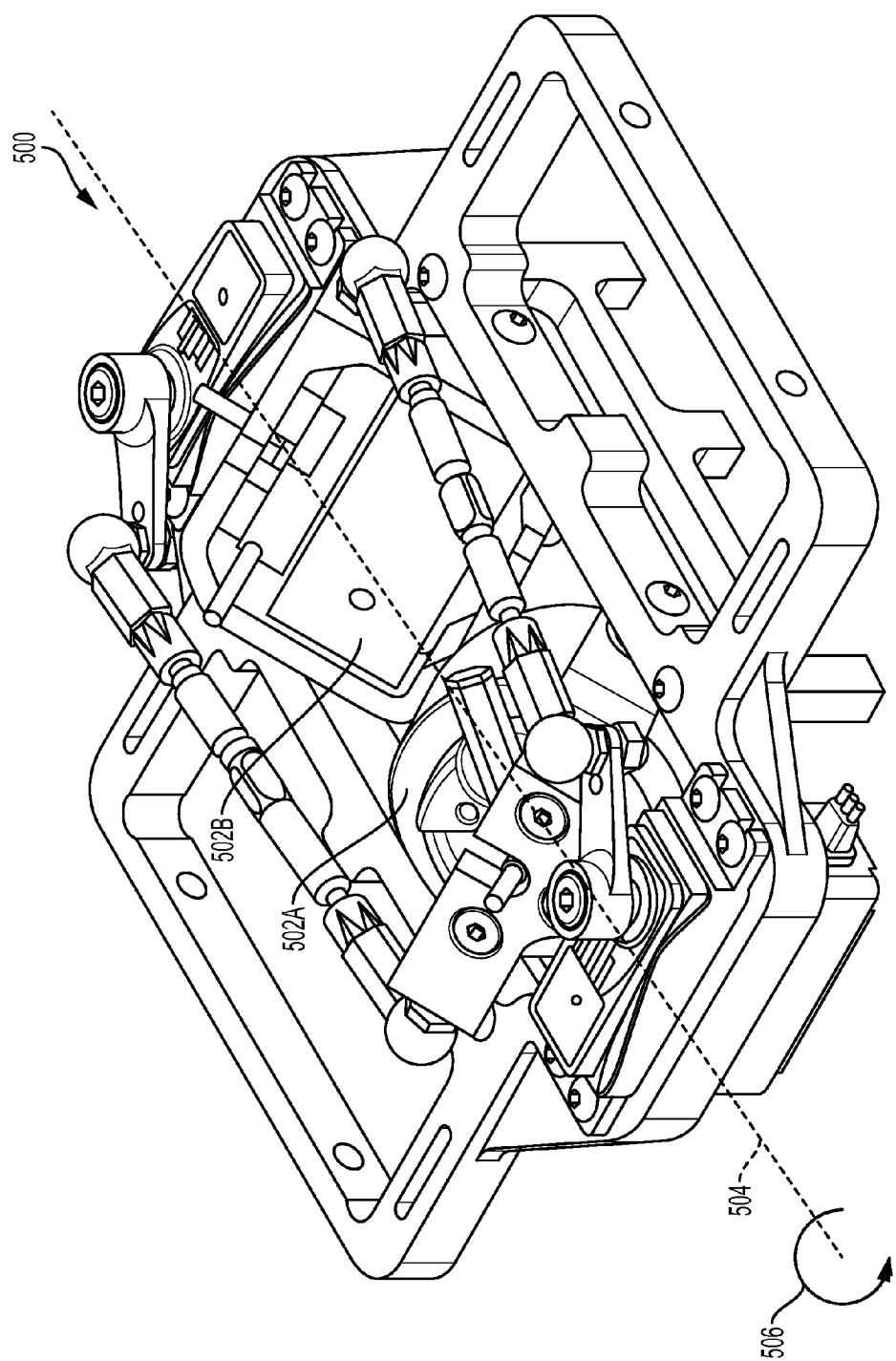
FIG. 5 illustrates an example RFCS system according to some embodiments.

FIG. 5 illustrates an example rotational force control system (RFCS) 500, including a first flywheel 502A, and a second flywheel 502B, where the tops of the two flywheels 502A/502B are tilted away from each other. FIG. 5 also shows roll axis 504. After accelerating the flywheels 502A/502B about their respective first axes to spin at equal (or substantially equal) rotational speeds in opposite directions, the RFCS 500 can tilt the flywheels 502A/502B by corresponding angles. The corresponding angles may be of equal (or substantially equal) amount but opposite direction about the respective second axes of the flywheels 502A/502B. For example, FIG. 5 shows the first flywheel 502A tilted at a first angle in a counterclockwise direction about its second axis (i.e. with the top of the first flywheel 502A tilted away from the second flywheel 502B), while the second flywheel 502B is tilted about its second axis at an equal second angle in the clockwise (opposite) direction (i.e., with the top of the second flywheel 502B tilted away from the first flywheel 502A).

Symmetric tilting of the flywheels 502A/502B, along with the equal rotational speeds of the flywheels 502A/502B, may cause a net increase in the angular momentum of the flywheels 502A/502B along the roll axis 504 towards the end of the RFCS 500 corresponding to the second flywheel 502B. This may cause the RFCS 500 and/or the attached vehicle to experience a rotational force along the roll axis 504 in a direction indicated at 506. The rotational force counterbalances the change in angular momentum of the tilting flywheels 502A/502B and, if the RFCS 500 (and the vehicle in which it is mounted) is isolated from external rotational forces, the RFCS 500 (and the vehicle in which it is mounted) will tend to rotate about the roll axis 504 in the direction indicated by arrow 506.

Figure 6:
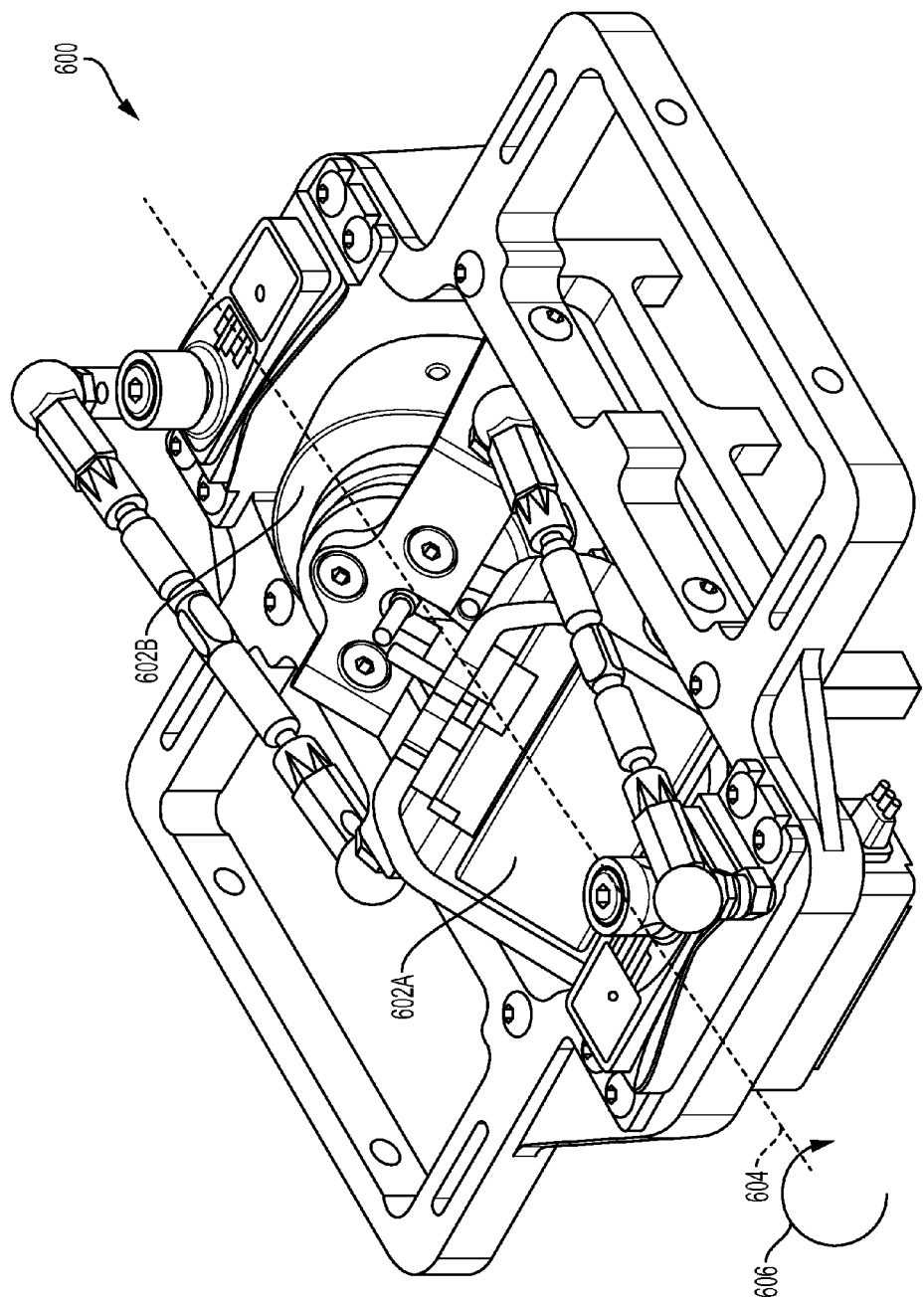
FIG. 6 illustrates an example RFCS system according to some embodiments.

FIG. 6 illustrates an example rotational force control system (RFCS) 600, including a first flywheel 602A, and a second flywheel 602B. FIG. 6 also shows roll axis 604. After accelerating the flywheels 602A/602B about their respective first axes to spin at equal (or substantially equal) rotational speeds but in opposite directions, the RFCS 600 can tilt the flywheels 602A/602B by corresponding angles. The corresponding angles may be of equal (or substantially equal) amount but opposite direction about the respective second axes of the flywheels 602A/602B. For example, FIG. 6 shows the first flywheel 602A tilted at a first angle in a clockwise direction about its second axis (i.e., where the top of the first flywheel 602A is tilted toward the second flywheel 602B), while the second flywheel 602B is tilted about its second axis at an equal (or substantially equal) second angle in the counterclockwise (opposite) direction (i.e., where the top of the second flywheel 602B is tilted toward the first flywheel 602A).

Symmetric tilting of the flywheels 602A/602B, along with the equal rotational speeds of the flywheels 602A/602B, may cause a net increase in the angular momentum of the flywheels 602A/602B along the roll axis 604 towards the end of the RFCS 600 corresponding to the first flywheel 602A. This may cause the RFCS 600 (and the vehicle in which it is mounted) to experience a rotational force along the roll axis 604 in a direction indicated at 606. The rotational force counterbalances the change in angular momentum of the tilting flywheels 602A/602B, and if the RFCS 600 and/or the vehicle are isolated from external rotational forces, the RFCS 600 may rotate in the direction indicated at 606.

The RFCS 600 may also cause the vehicle to experience simultaneous roll-inducing and yaw-inducing forces. For example, when viewed from above, the first flywheel 602A may spin clockwise and the second flywheel 602B may spin counterclockwise at equal rotational speeds, tilted at angles shown in FIG. 4. The flywheels 602A/602B may then be tilted as shown in FIG. 6 while at the same time the respective rotational speeds of the flywheels 602A/602B are increased and decreased by equal (or substantially equal) amounts, respectively. For example, the first flywheel 602A may increase rotational speed from 50 Hz to 60 Hz while the second flywheel 602B may decrease rotational speed from 50 Hz to 40 Hz, while the flywheels 602A/602B tilt as shown in FIG. 6. This may cause the RFCS 600 (and the vehicle in which it is mounted) to experience a rotational force about the roll axis 604 in the direction 606 while simultaneously experiencing a rotational force about a yaw axis of the RFCS 600 (and the vehicle) in a direction 414, as shown in FIG. 4.

Figure 7:
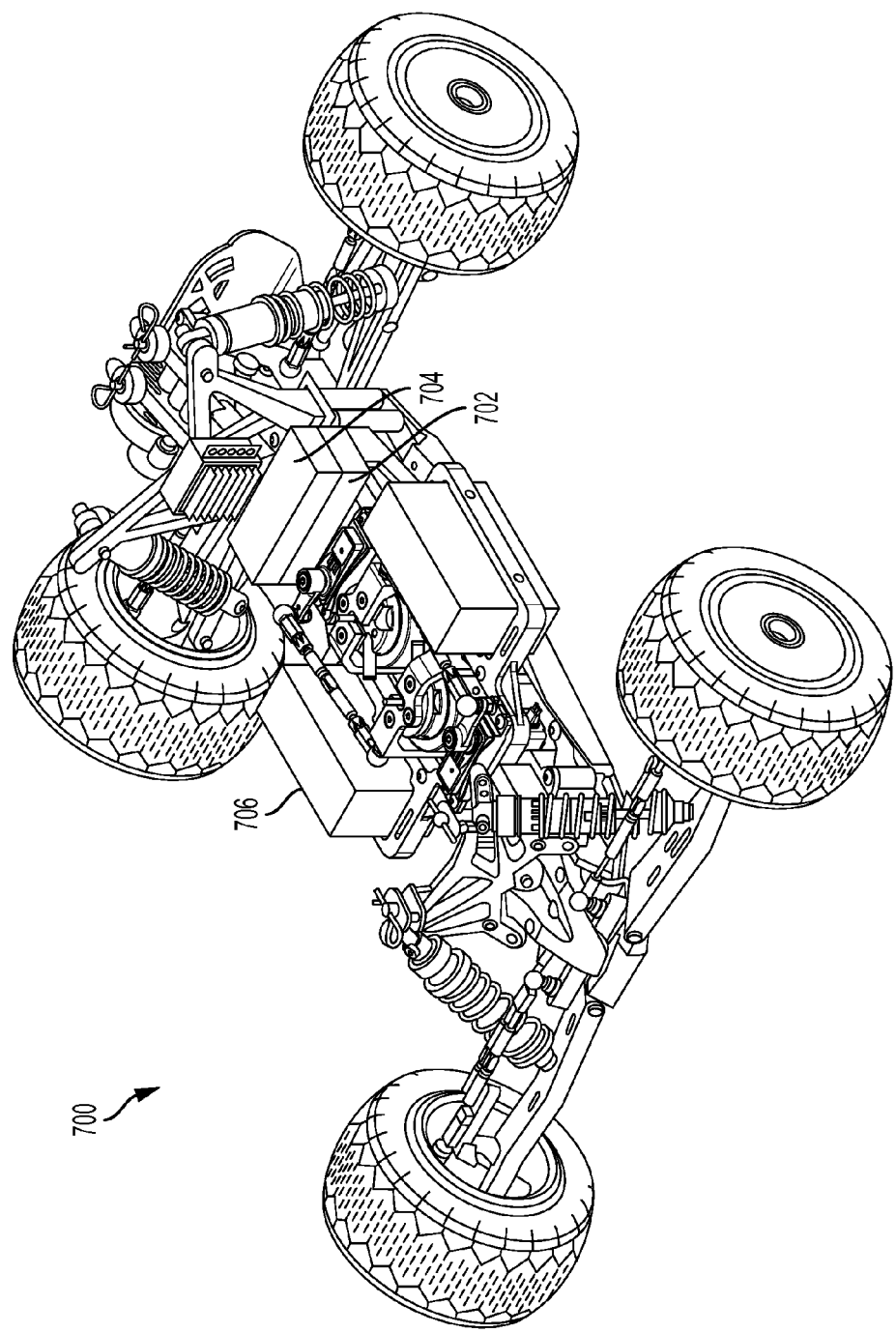
FIG. 7 illustrates an example remote-controlled (RC) car equipped with a RFCS system.

FIG. 7 illustrates an example remote-controlled (RC) car 700, including a first electronic speed controller (ESC) 702, a second ESC 704, and a battery 706. The first ESC 702 and the second ESC 704 may be respectively configured to spin motors and/or flywheels of a rotational force control system at desired rotational speeds as described herein with reference to FIGS. 4-6 for example. The battery 706 provides electric power to a drivetrain of the car 700, to the ESCs 702/704, to a steering mechanism, and/or any other component of the car 700 that uses electric power. Other power sources are possible.

Figure 8:
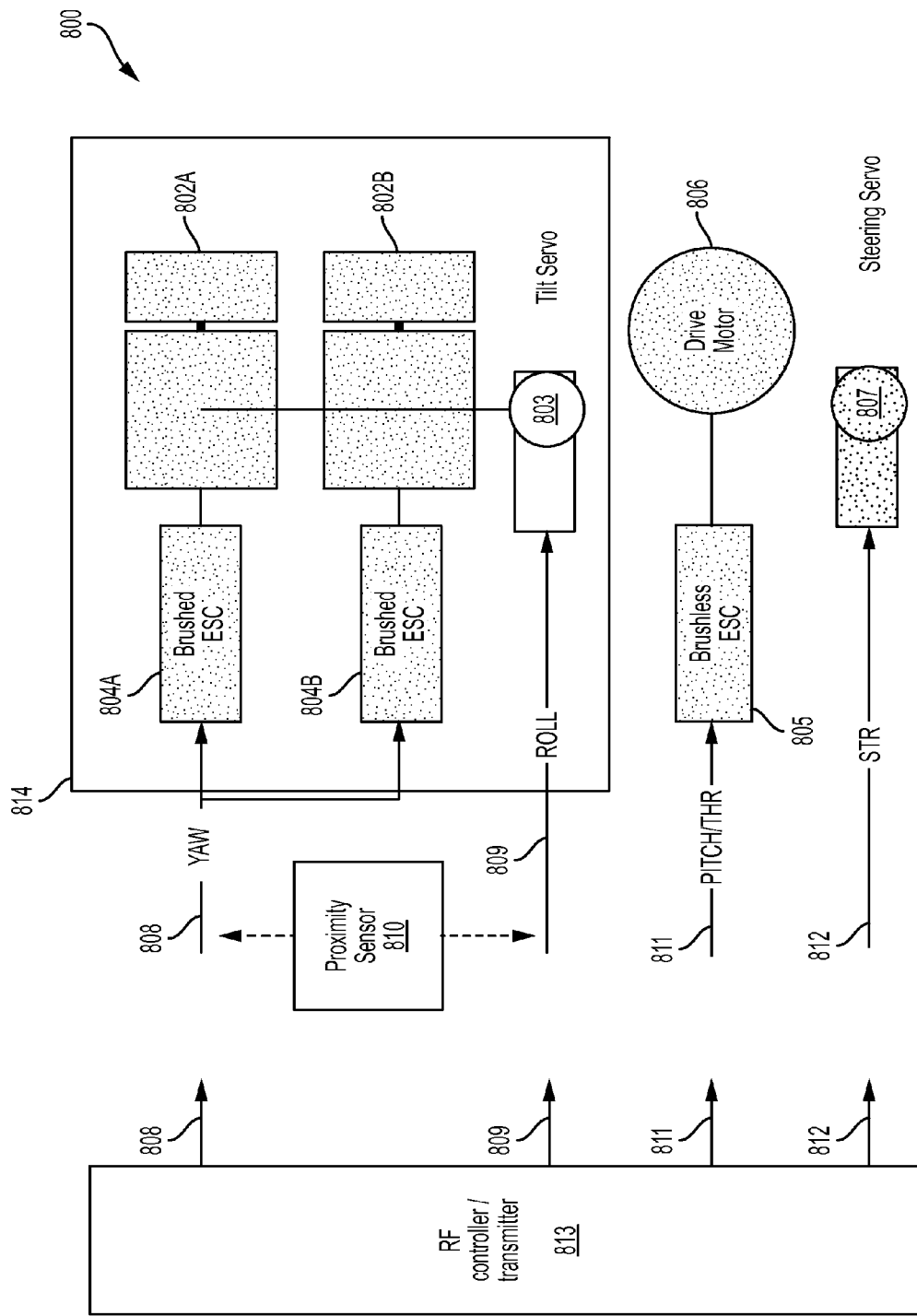
FIG. 8 is an example schematic diagram of a control system of a vehicle according to some embodiments.

FIG. 8 is an example schematic diagram of a rotational force control system (RFCS) 800 of a vehicle and an RF controller/transmitter 813 for controlling the vehicle. The RFCS 800 system includes a first flywheel 802A, a second flywheel 802B, a tilt servo(s) 803, brushed electronic speed controllers (ESCs) 804A/804B, a brushless ESC 805, a drive motor 806, and a steering servo 807. In operation, the control system 800 receives yaw input 808, roll input 809, pitch/ throttle input 811 and steering input 812 from the RF controller/transmitter 813. In some instances, the yaw 808 inputs and roll inputs 809 may additionally or alternatively include or otherwise be influenced by inputs from a proximity sensor 810.

The tilt servo(s) 803 and the flywheels 802A/802B and their corresponding brushed ESCs 804A/804B comprise an attitude control subsystem 814. The attitude control subsystem 814 may be configured to receive and respond to the yaw inputs 808 and roll inputs 809 from the RF controller/ transmitter 813. The yaw inputs 808 and roll inputs 809 may respectively indicate a desired yaw angle and a roll angle for the vehicle, or desired rates of change of yaw and roll.

In some embodiments, the attitude control subsystem 814 may be configured to ignore or override (or perhaps alter) the yaw inputs 808 and roll inputs 809 based on input from a proximity sensor 810 coupled to the vehicle or the vehicle chassis. The proximity sensor 810 (e.g. an infrared sensor or similar) may be configured to detect whether the vehicle is contacting a driving surface underlying the vehicle (e.g., the ground, a racetrack, etc.) by emitting electromagnetic radiation and detecting electromagnetic radiation reflected from the driving surface, thereby determining the distance between the sensor 810 and the driving surface. The sensor 810 may also include a digital filter configured to distinguish between the driving surface and particles (e.g., dirt, debris, etc.) churned up by motion of the vehicle along the driving surface. Other forms of proximity sensors may be used. In response to determining that the vehicle is contacting the driving surface, the proximity sensor 810 may provide yaw 808 and roll 809 inputs to the attitude control subsystem 814, and cause the attitude control subsystem 814 to ignore or override commands or other inputs to tilt or vary rotational speeds of flywheels 802A/802B.

The proximity sensor 810 may also provide a notification indicating that the vehicle is not contacting the driving surface. For example, the vehicle may be airborne after jumping off of a ramp. In such a situation, the attitude control subsystem 814 may enable tilt and rotation speed controls based on receiving the notification that the vehicle is airborne. This may ensure that energy is not wasted attempting to change the attitude of the vehicle in some instances while the vehicle is on the ground.

The attitude control subsystem 814 may receive yaw inputs 808 from the RF controller/transmitter 813. For example, the yaw input 808 may indicate to change the yaw angle of the vehicle or the rate of change of the yaw angle of the vehicle (e.g. due north, or 30° clockwise per second). In response, the first and second brushed ESCs 804A/804B may respectively cause the first and second flywheels 802A/802B to spin at increased or decreased rotational speeds about their first axes that correspond to the indicated yaw angle or rate of change of the yaw angle.

The attitude control subsystem 814 may also receive roll inputs 809 from an RF transmitter. For example, the roll input 809 may indicate to change the roll angle of the vehicle or the rate of change of the roll angle of the vehicle (e.g. right 20° relative to a horizon, or 20° clockwise per second). In response, the tilt servo(s) 803 may cause the flywheels 802A/802B to tilt about their respective second axes at corresponding angles that cause the desired change of the roll angle or rate of change of the roll angle.

The vehicle may also receive a pitch/throttle input 811 from the RF controller/transmitter 813. In response, the brushless ESC 805 may provide control signals to the drive motor 806 of the vehicle based on the pitch/throttle input 811. For example, the pitch/throttle input 811 may indicate to provide full power to the drive motor 806. And in response, the brushless ESC 805 may provide full power to the drive motor 806, thereby causing the vehicle to linearly accelerate along the ground, or possibly lift the front end of the vehicle off the ground by applying power to the rear wheels. Other examples are possible as well.

The vehicle may also receive a steering input 812 from the RF controller/transmitter 813. For example, the steering input 812 may indicate to tilt front wheels of the vehicle 20° to the right, to negotiate a turn, for example. In response, the steering servo 807 may change a position of a steering mechanism to tilt the wheels of the vehicle.

In some instances, it may be desirable to cause rotation about one or more axes of the vehicle while the vehicle is airborne. For example, a racetrack may have multiple hills/ramps and turns, including turns that follow shortly after ramps. In such circumstances, it may be desirable to drive the car over the hill/ramp to cause the vehicle to go airborne. And then, while the vehicle is in the air, it may be further desirable to start turning the vehicle in the direction of the upcoming turn. This can be accomplished with the disclosed rotational force control system (RFCS) by generating roll and yaw forces (as described with reference to FIGS. 4-6, for example) to cause the vehicle to begin turning while the vehicle is airborne. For example, if the upcoming turn is to the right, then the RFCS can generate a roll force to the right (perhaps to accommodate an upcoming banked driving surface) and/or a yaw force to the right to cause the vehicle to turn to the right while still airborne so that when the vehicle lands, it is already heading in the direction of the right curve (or least in a direction that is better positioned for the right curve than it would have been without the RFCS).

In other example, the RFCS may be used to cause the vehicle to perform airborne stunts and/or tricks. For example, the RFCS can be used to cause the vehicle to perform a corkscrew-type maneuver in the air after jumping off of a ramp by generating a force about the roll axis of the vehicle (as described with reference to FIGS. 4-6) while the vehicle is airborne. Similarly, the RFCS can be used to rotate the vehicle about its yaw axis while the vehicle is airborne by generating a force about the yaw axis of the vehicle (as described with reference to FIGS. 4-6) while the vehicle is airborne. The RFCS could be used to perform similar tricks by generating roll and/or yaw forces about the roll and/or yaw axes of the vehicle as well.

In some instances, it may also be desirable to cause rotation about one or more axes of the vehicle while the vehicle is in contact with the driving surface. For example, when approaching a left curve, it is possible to use the disclosed rotational force control systems (RFCS) to improve vehicle handling by rolling the vehicle slightly to the left, and/or yawing the vehicle slightly to the left. Then, when accelerating out of the left curve, the RFCS may also be used to return the vehicle to a normal (or level) roll and yaw to improve the forward acceleration force that that vehicle's rear wheels apply to the ground to improve acceleration out of the turn.

Figure 9:
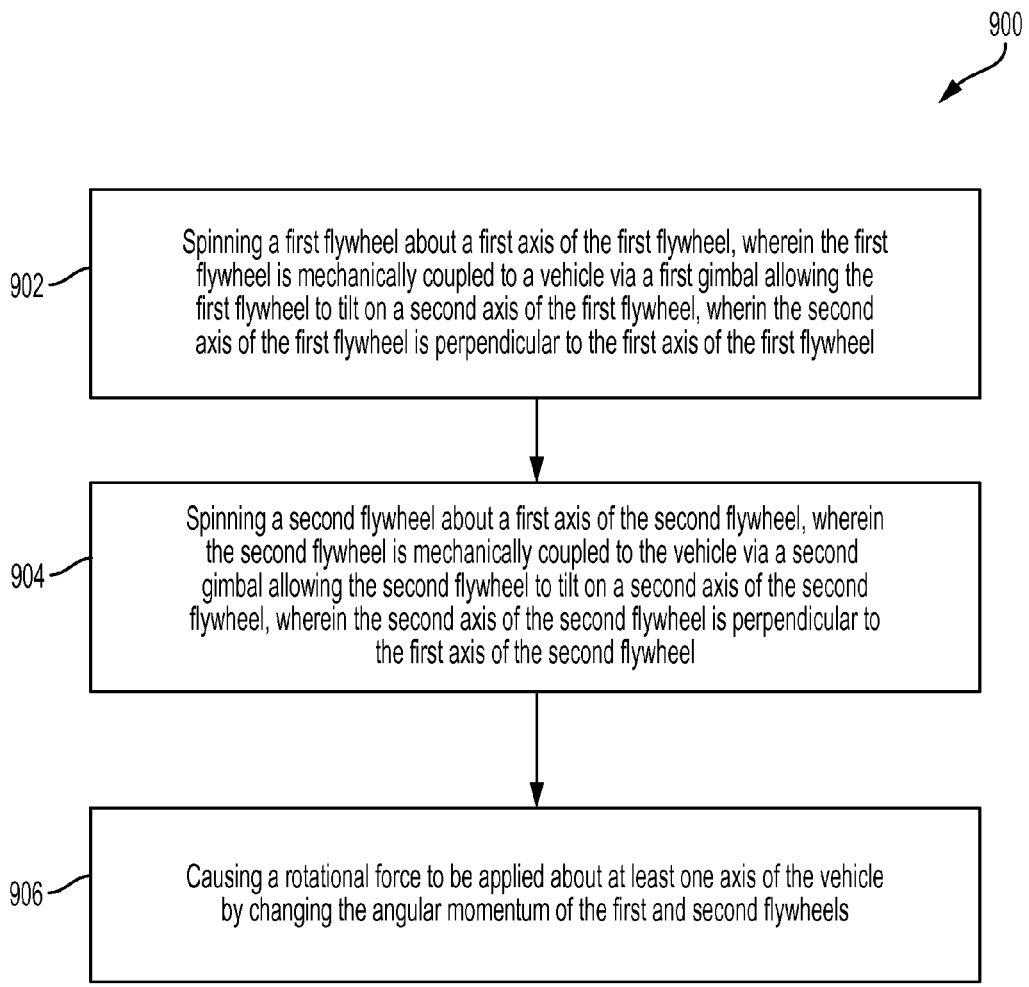
FIG. 9 is a block diagram of an example method according to some embodiments.

FIG. 9 is a block diagram of an example method 900 for causing a rotational force to be applied about at least one axis of a vehicle by changing an angular momentum of flywheels. The method may be performed by the RFCS disclosed in FIGS. 4-8, for example.

Method 900 may include one or more operations, functions, or actions as illustrated by one or more blocks of 902-906. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

At block 902, the method includes spinning a first flywheel about a first axis of the first flywheel. The first flywheel may be mechanically coupled to a vehicle via a first gimbal, allowing the first flywheel to tilt about a second axis of the first flywheel. The second axis of the first flywheel may be perpendicular to the first axis of the first flywheel.

At block 904, the method includes spinning a second flywheel about a first axis of the second flywheel. The second flywheel may be mechanically coupled to the vehicle via a second gimbal, allowing the second flywheel to tilt about a second axis of the second flywheel. The second axis of the second flywheel may be perpendicular to the first axis of the second flywheel.

In some embodiments, the first and second flywheels may be initially tilted to align their respective first axes so that they are mutually parallel and the first and second flywheels may initially spin in opposite directions at substantially equal rotational speeds. Although this step may not cause a net change in angular momentum, it may enable the RFCS to quickly change the angular momentum of the flywheels by a considerable amount by tilting the flywheels, or increasing or decreasing their respective rotational speeds.

At block 906, the method includes causing a rotational force to be applied about at least one axis of the vehicle by changing an angular momentum of the first and second flywheels. For example, the first flywheel may be tilted in a first direction about the second axis of the first flywheel and the second flywheel may be tilted in a second direction about the second axis of the second flywheel. In some embodiments, the first and second flywheels may be tilted in opposite directions (i.e. clockwise and counterclockwise). The first and second flywheels may be tilted by respective corresponding angles (i.e. angles of equal value but opposite direction.) In another example, the method may include increasing a first rotational speed of the first flywheel and decreasing the second rotational speed of the second flywheel, which may cause the vehicle to experience a rotational force about a yaw axis. If the respective rotational speeds of the first and second flywheels are increased and decreased by equal amounts, there may be no net force induced about the vehicle's roll axis.

The method may further include determining that the vehicle is not contacting a driving surface and changing the angular momentum of the first and second flywheels in response to determining that the vehicle is not contacting the driving surface. For example, an RF transmitter may transmit a command to change a yaw, pitch, or roll angle of the vehicle, but indicate not to make the change until a proximity sensor of the vehicle has detected that the vehicle has left the ground, such as during a stunt. In this way, operations to change the attitude of the vehicle may be performed while the vehicle is isolated from external rotational forces and free to change attitude more easily than compared to when the vehicle is on the ground.

The method may further include determining that the vehicle is contacting a driving surface and causing an attitude control module of the vehicle to override commands to change the angular momentum of the first or second flywheels. For example, the attitude control module may be configured to disregard commands to alter the yaw, pitch, or roll of the vehicle until the attitude control module receives a notification, perhaps from a proximity sensor, that the vehicle has left the ground and is free to change attitude more easily than compared to when the vehicle is on the ground.

In other embodiments, the method may include causing a rotational force to be applied to the vehicle while the vehicle is contacting a driving surface. For example, the vehicle may be performing a turn and experiencing a centrifugal force tending to push the vehicle outside of the radius of the turn. The angular momenta of the flywheels may be changed so that the vehicle experiences a rotational force in a yaw or a roll axis that aids the vehicle in making the turn. As an example, a roll inducing force could be used to prevent a rollover that may otherwise be caused by attempting an abrupt turn, or a yaw inducing force could be used to prevent a loss of fraction of rear wheels (i.e. fishtailing).

While particular aspects and embodiments are disclosed herein, other aspects and embodiments will be apparent to those skilled in the art in view of the foregoing teaching. For example, while the embodiments are described with respect to applications for RC vehicles, the disclosed systems and methods are not so limited. The various aspects and embodiments disclosed herein are for illustration purposes only and are not intended to be limiting, with the true scope and spirit being indicated by the following claims.

What is claimed is:

1. A method comprising:
   spinning a first flywheel about a first axis of the first flywheel, wherein the first flywheel is mechanically coupled to a vehicle via a first gimbal allowing the first flywheel to tilt about a second axis of the first flywheel, wherein the second axis of the first flywheel is perpendicular to the first axis of the first flywheel;
   controlling rotational speed of the first flywheel with a first electronic speed controller;
   spinning a second flywheel about a first axis of the second flywheel, wherein the second flywheel is mechanically coupled to the vehicle via a second gimbal allowing the second flywheel to tilt about a second axis of the second flywheel, wherein the second axis of the second flywheel is perpendicular to the first axis of the second flywheel;
   controlling rotational speed of the second flywheel with a second electronic speed controller;
   causing a rotational force to be applied about at least one axis of the vehicle by changing an angular momentum of the first and second flywheels.

2. The method of claim 1, wherein causing a rotational force to be applied about at least one axis of the vehicle by changing an angular momentum of the first and second flywheels comprises:
   causing a rotational force to be applied about a roll axis of the vehicle by tilting the first flywheel in a first direction about the second axis of the first flywheel and tilting the second flywheel in a second direction about the second axis of the second flywheel.

3. The method of claim 2, wherein the first direction is opposite the second direction.

4. The method of claim 2, wherein tilting the first flywheel and tilting the second flywheel comprise tilting the first and second flywheels by first and second corresponding angles.

5. The method of claim 1, wherein spinning the first and second flywheels comprises spinning the first and second flywheels in opposite directions.

6. The method of claim 1, wherein spinning the first and second flywheels comprises spinning the first and second flywheels at substantially equal rotational speeds.

7. The method of claim 1, further comprising:
   determining that the vehicle is not contacting a driving surface; and
   changing the angular momentum of the first and second flywheels in response to determining that the vehicle is not contacting the driving surface.

8. The method of claim 1, further comprising:
   determining that the vehicle is contacting a driving surface; and
   causing an attitude control module of the vehicle to override commands to change the angular momentum of the first or second flywheels.

9. The method of claim 1, further comprising performing the method of claim 1 to cause a rotational force to be applied to the vehicle while the vehicle is contacting a driving surface.

10. The method of claim 1, wherein causing a rotational force to be applied about at least one axis of the vehicle by changing an angular momentum of the first and second flywheels comprises:
    causing a rotational force about a yaw axis of the vehicle by increasing a first rotational speed of the first flywheel and decreasing a second rotational speed of the second flywheel.

11. The method of claim 10, wherein increasing the first rotational speed and decreasing the second rotational speed comprise:
    increasing the first rotational speed and decreasing the second rotational speed by substantially equal amounts.

12. A vehicle comprising:
    a rotational force control system (RFCS) coupled to a vehicle chassis, the RFCS comprising:
    a frame;
    a first flywheel mechanically coupled to the frame, wherein the first flywheel is configured to spin about a first axis of the first flywheel and tilt about a second axis of the first flywheel;
    a first electronic speed controller electrically coupled to the first flywheel to control a rotational speed of the first flywheel;
    a second flywheel mechanically coupled to the frame, wherein the second flywheel is configured to spin about a first axis of the second flywheel and tilt about a second axis of the second flywheel;
    a second electronic speed controller electrically coupled to the second flywheel to control a rotational speed of the second flywheel; and
    wherein the RFCS is configured to cause a rotational force to be applied about at least one axis of the vehicle by changing an angular momentum of the first or second flywheels.

13. The vehicle of claim 12, wherein the first and second electronic speed controllers are configured to control rotational speeds of motors configured to rotate the first and second flywheels.

14. The vehicle of claim 12, wherein the RFCS further comprises:
    a first gimbal, wherein the first flywheel is mechanically coupled to the frame via the first gimbal allowing the first flywheel to tilt about the second axis of the first flywheel; and
    a second gimbal, wherein the second flywheel is mechanically coupled to the frame via the second gimbal allowing the second flywheel to tilt about the second axis of the second flywheel.

15. The vehicle of claim 14, wherein the RFCS further comprises:
    a first servo motor comprising a first output shaft;

a first arm assembly mechanically coupling the first output shaft to the first gimbal so that the first servo motor is configured to tilt the first flywheel about the second axis of the first flywheel;

a second servo motor comprising a second output shaft; and a second arm assembly mechanically coupling the second output shaft to the second gimbal so that the second servo motor is configured to tilt the second flywheel about the second axis of the second flywheel.

16. The vehicle of claim 15, wherein the first arm assembly comprises:

a first servo arm; and a first linkage arm, wherein the first linkage arm mechanically couples the first gimbal to the first servo arm; and the second arm assembly comprises:

a second servo arm; and a second linkage arm, wherein the second linkage arm mechanically couples the second gimbal to the second servo arm.

17. The vehicle of claim 12, further comprising:

a sensor coupled to the vehicle chassis and configured to detect whether the vehicle is contacting a driving surface.

18. The vehicle of claim 17, wherein the sensor is configured to detect whether the vehicle is contacting the driving surface by emitting electromagnetic radiation and detecting electromagnetic radiation reflected from the driving surface, thereby determining a distance between the sensor and the driving surface.

19. The vehicle of claim 17, wherein the sensor comprises a digital filter configured to distinguish between the driving surface and particles churned up by motion of the vehicle along the driving surface.

* * * * *